March 28, 1961  J. O. CAMERON  2,976,904
TIRE CHAINS AND ATTACHING MEANS THEREFOR
Filed Nov. 5, 1958  2 Sheets-Sheet 1

Inventor:
John O. Cameron,
by Albt Spear,
Attorney

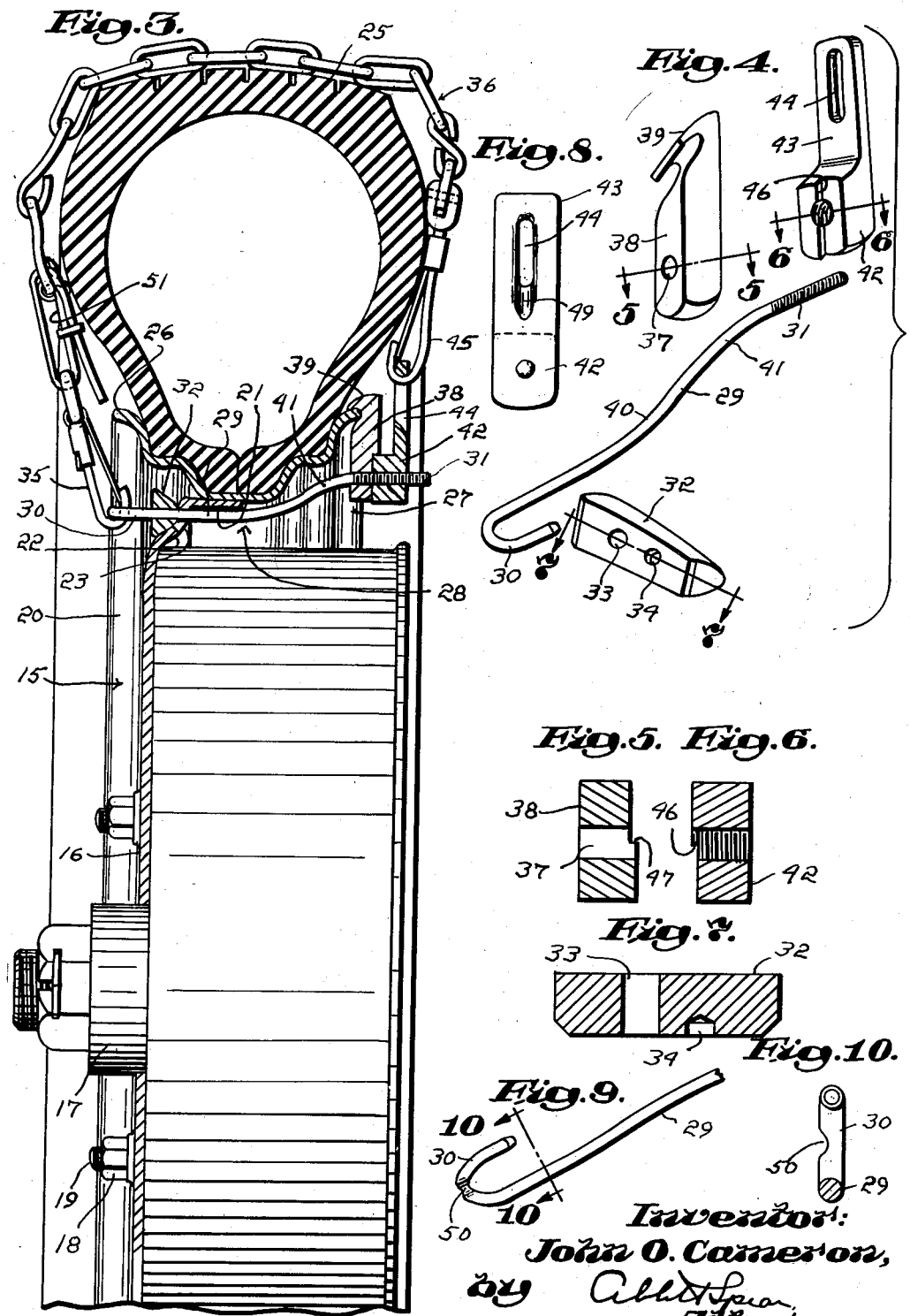

United States Patent Office

2,976,904
Patented Mar. 28, 1961

2,976,904

TIRE CHAINS AND ATTACHING MEANS THEREFOR

John O. Cameron, 11 Hoover Ave., Quincy 69, Mass.

Filed Nov. 5, 1958, Ser. No. 772,048

8 Claims. (Cl. 152—237)

The present invention relates to tire chain units of the cross chain type and anchors for attaching them to the wheels of motor vehicles.

Tires provided with so called "snow treads" have made winter driving less dangerous. In spite of their widespread acceptance, they are not a substitute for tire chains when iced conditions are encountered even though they are somewhat safer in use than conventional treads. Strong objections to the use of tire chains persist and these are largely concerned with difficulties associated with mounting them and on removing them from the wheels of a vehicle.

The principal objectives of the present invention are to provide a cross chain tire unit that can be attached to or removed from motor vehicle wheels with maximum ease and convenience and to provide anchors for such cross chains that may be attached to motor vehicle wheels without interference with wheel covers thus to be readily available whenever road conditions warrant the additional safety that only tire chains can afford.

In accordance with the invention, these objectives are attained by providing a cross chain unit with an attaching hook at each of its ends and with means for adjustably varying the overall length of such a unit and by providing anchors therefor. The anchors are adapted for use with wheels of the type in which each has a central body, a flange extending inwardly with respect thereto in parallel with the wheel axis, and an intermediate shoulder portion having arcuately spaced holes. The tire receiving rim is secured to the flange and has its sides terminating in flanges, each curving away from the tire.

An anchor has an element passed through one of the holes and it is provided with an eye for one of the cross chain hooks and a shoudler engaging anchor member at its outer end and anchor means, at its inner end, including a member provided with a hook caught on the inner rim flange and a second eye for the other cross chain hook.

In practise, the anchor member is an element rod stock and has a hook at its outer end and has its inner end threaded and there are outer and inner anchor members, each slidable on the element, and a nut threaded on the inner end of the element with the outer anchor member in engagement with the wheel shoulder portion and the inner member caught on the edge of the inner side of the tire receiving rim. The nut has an eye for the other cross chain hook.

Figure 1:
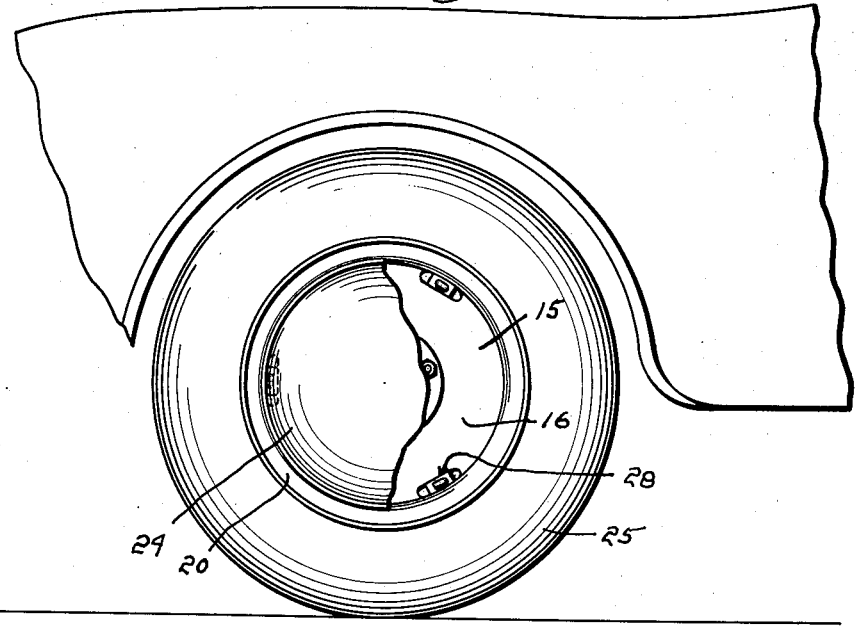
Figure 2:
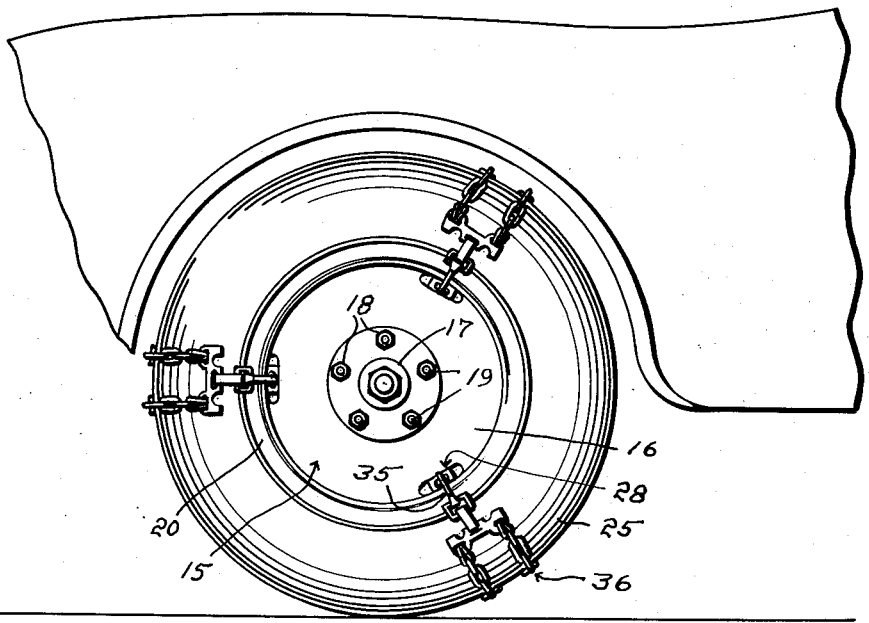

In the accompanying drawings, there is shown an illustrative embodiment of the invention from which these and other of its objectives, novel features, and advantages will be readily apparent. In the drawings, Fig. 1 is a fragmentary view of a motor vehicle, showing a wheel, with its cover partly broken away, equipped with tire chain anchors in accordance with the invention, Fig. 2 is a view similar to Fig. 1 but with the wheel cover removed and chain units attached to the anchors, Fig. 3 is a fragmentary cross section, on a substantially increased scale, of the wheel of Fig. 2, Fig. 4 is an exploded view of the anchor parts with such parts being shown in perspective, Figs. 5, 6, and 7 are sections taken along the indicated lines 5—5, 6—6, and 7—7, respectively, of Fig. 4, Fig. 8 is a view showing the outer face of the nut of the anchor, Fig. 9 is a fragmentary view of the anchor element showing the groove in the under surface of its hook end, and Fig. 10 is a section taken along the indicated lines 10—10 of Fig. 9.

An automobile wheel is generally indicated at 15 and, while it may be of any type or style, it is shown as having a central body part 16 apertured to receive the hub 17 and conventionally locked in place by nuts 18 threaded on lugs 19.

A multi-shouldered rim 20 is attached to an annular flange 21 disposed inwardly in parallel with the wheel axis. Between the wheel body 16 and the flange 21, there is shown an intermediate curved portion 22 defining an annular channel. Closely adjacent the flange 21, the wheel portion 22 is provided with a series of arcuately spaced holes 23, usually in the form of slots. A wheel cover 24 conceals the outer face of the wheel.

A tire 25 is seated in the rim 20 and the margins 26 and 27 of the sides of the rim are curved away from the tire as may best be seen in Fig. 3.

An anchor in accordance with the invention is generally indicated at 28 and is shown as comprising an element 29 of rod stock disposable through a slot 23 and having its outer end bent to provide a hook 30 and its other or inner end threaded as at 31. An anchor member 32 is shown in the form of an elongated and arcuate part of a cross sectional shape to seat in the channel 22. The member 32 has a hole 33 freely receiving an element 29 and it also has a socket 34 to receive the free end of the hook 30 of the received element 29 so that the hook 30 and the member 32, when assembled together, form an eye on the outer face of the wheel adapted to receive the snap hook 35 of the cross chain unit 36.

The threaded end 31 of the element 29 passes freely through a hole 37 in a second anchor member 38 located on the inner wheel face and shown as having a hook 39 for engagement with the rim flange 27 and in order that the threaded end 31 may lie somewhat closer to the flange 27 than the hook end 30 does to the flange 26, the element 29 is provided with intermediate reverse bends as at 40 and 41.

Threaded on the element end 31 is a nut 42 having a flange 43 at its front end that is slotted as at 44 to receive the snap hook 45 at the other end of the cross chain unit. In practice, the proximate faces of the nut 42 and the second anchor member 38 are formed with complemental shoulders 46 and 47, respectively, which engage when the nut has been threaded on the end 31 to a predetermined extent and the flange is positioned with its slot 44 radially disposed and proximate to the tire 25.

Anchors in accordance with the invention are adapted to be left on the wheels as it will be noted that the wheel cover 23 conceals them. When chains are needed, however, the wheel cover is removed and the snap hook 45 is passed over the tire and brought into engagement with the outer face of the nut flange 43 so that its end may be entered through the slot 44. To facilitate such entry, the flange has beveled edges as at 49.

The chain unit is then pulled against the tire so that its snap hook 35 may be caught through the eye defined by the hook 30 and the anchor member 32. To facilitate such entry, the hook 30 is grooved as at 50. In practice, the hook 30 is connected to the cross chain unit by an adjustable strap 51.

What I therefore claim and desire to secure by Letters Patent is:

1. A tire chain anchor for use with a cross chain unit having hooks at its ends and a tire mounted on the rim of wheel of the type having a central body part, a flange extending inwardly with respect thereto in parallel with the wheel axis and to which the rim is attached, and an intermediate annular curved shoulder provided with arcuately spaced holes, said rim having its sides terminating in flanges, each curving away from the tire, said anchor comprising an element to be passed through one of said holes and including, at its outer end, an eye for one of said chain hooks and a shoulder engaging anchor member, the other end of said element being threaded, a second anchor member having a hole through which said threaded end freely extends and which includes a hook engageable with the inner rim flange, and a nut threaded on said anchor end against said second member and including an eye for the other chain hook.

2. A tire chain anchor for use with a cross chain unit having hooks at its ends and a tire mounted on the rim of wheel of the type having a central body part, a flange extending inwardly with respect thereto in parallel with the wheel axis and to which the rim is attached, and an intermediate annular curved shoulder provided with arcuately spaced holes, said rim having its sides terminating in flanges, each curving away from the tire, said anchor comprising an element to be passed through one of said holes and including a hook at its outer end, a shoulder engaging anchor member having a hole through which said element freely extends and which has a socket to receive the free end of said hook, said hook end and said anchor member establishing an eye for one of said chain hooks, the other end of said element being threaded, a second anchor member having a hole through which said threaded end freely extends and which includes a hook engageable with the inner rim flange, and a nut threaded on said anchor end against said second member and including an eye for the other chain hook.

3. A tire chain anchor for use with a cross chain unit having hooks at its ends and a tire mounted on the rim of wheel of the type having a central body part, a flange extending inwardly with respect thereto in parallel with the wheel axis and to which the rim is attached, and an intermediate annular curved shoulder provided with arcuately spaced holes, said rim having its sides terminating in flanges, each curving away from the tire, said anchor comprising an element to be passed through one of said holes and including, at its outer end, an eye for one of said chain hooks and a shoulder engaging anchor member, the other end of said element being threaded, a second anchor member having a hole through which said threaded end freely extends and which includes a hook engageable with the inner rim flange, and a nut threaded on said anchor end against said second member and including a slot establishing an eye for the other chain hook, the proximate faces of said second member and said nut being provided with complemental shoulders interengageable when said nut is rotated in one direction to a predetermined extent, said nut eye being proximate to said inner rim flange.

4. A tire chain anchor for use with a cross chain unit having hooks at its ends and a tire mounted on the rim of wheel of the type having a central body part, a flange extending inwardly with respect thereto in parallel with the wheel axis and to which the rim is attached, and an intermediate annular curved shoulder provided with arcuately spaced holes, said rim having its sides terminating in flanges, each curving away from the tire, said anchor comprising an element to be passed through one of said holes and including at its end, an eye for one of said chain hooks and a shoulder engaging anchor member, the other end of said element being threaded, a second anchor member having a hole through which said threaded end freely extends and which includes a hook engageable with the inner rim flange, and a nut threaded on said anchor end against said second member and including a slot establishing an eye for the other chain hook, when the slot is radially disposed, the face of said nut remote from said wheel including a hook receiving and guiding channel in communication with said slot.

5. A tire chain anchor for use with a cross chain unit having hooks at its ends and a tire mounted on the rim of wheel of the type having a central body part, a flange extending inwardly with respect thereto in parallel with the wheel axis and to which the rim is attached, and an intermediate annular curved shoulder provided with arcuately spaced holes, said rim having its sides terminating in flanges, each curving away from the tire, said anchor comprising an element to be passed through one of said holes and including at its outer end, an eye for one of said chain hooks and a shoulder engaging anchor member, said eye including a groove for centering that chain hook, the other end of said element being threaded, a second anchor member having a hole through which said threaded end freely extends and which includes a hook engageable with the inner rim flange, and a nut threaded on said anchor end against said second member and including an eye for the other chain hook.

6. A tire chain anchor for use with a cross chain unit having hooks at its ends and a tire mounted on the rim of wheel of the type having a central body part, a flange extending inwardly with respect thereto in parallel with the wheel axis and to which the rim is attached, and an intermediate annular curved shoulder provided with arcuately spaced holes, said rim having its sides terminating in flanges, each curving away from the tire, said anchor comprising an element to be extended through one of said holes and including at its outer end, an eye for one of said chain hooks and a shoulder engaging anchor member, and means adjacent the other end of said element including a hook engageable with the inner rim flange and an eye for the other of said chain hooks and located beyond said inner rim flange and adjacent the extremity thereof.

7. In combination, a tire chain and anchor for use with a tire mounted on the rim of wheel of the type having a central body, a flange extending inwardly with respect thereto in parallel with the wheel axis and to which the rim is attached, and an intermediate annular curved shoulder provided with arcuately spaced holes, said rim having its sides terminating in flanges, each curving away from the tire, said tire chain including a cross chain unit including a hook at each end thereof, and said anchor comprising an element to be passed through one of said holes and including at its outer end, an eye for one of said chain hooks and a shoulder engaging anchor member, the other end of said element being threaded, a second anchor member having a hole through which said threaded end freely extends and which includes a hook engageable with the inner rim flange and supporting the proximate end of the element, and a nut threaded on said anchor end against said second member and including an eye for the other chain hook.

8. In combination, a tire chain and anchor for use with a tire mounted on the rim of wheel of the type having a central body, a flange extending inwardly with respect thereto in parallel with the wheel axis and to which the rim is attached, and an intermediate annular curved shoulder provided with arcuately spaced holes, said rim having its sides terminating in flanges, each curving away from the tire, said tire chain including a cross chain unit including a hook at each end thereof and said anchor comprising an element extending through one of said holes and including at its outer end, an eye for one of said chain hooks and a shoulder engaging anchor member, said eye being spaced beyond said inner rim flange and adjacent the extremity thereof, a second anchor member adjacent the other end of said element including a hook engageable with the inner rim flange and provided with an eye for the other chain hook, said second anchor member supporting the proximate end of said element in a predetermined position.

References Cited in the file of this patent

UNITED STATES PATENTS

| | | |
|---|---|---|
| 1,289,194 | Knobloch | Dec. 31, 1918 |
| 1,440,630 | Schein | Jan. 2, 1923 |
| 2,146,453 | Stahl | Feb. 7, 1939 |
| 2,434,362 | Landes | Jan. 13, 1948 |